(12) United States Patent
Itagaki et al.

(10) Patent No.: US 11,767,876 B2
(45) Date of Patent: Sep. 26, 2023

(54) POWER TRANSMISSION SHAFT

(71) Applicant: NTN CORPORATION, Osaka (JP)

(72) Inventors: Taku Itagaki, Shizuoka (JP); Minoru Ishijima, Shizuoka (JP)

(73) Assignee: NTN CORPORATION, Osaka (JP)

( * ) Notice: Subject to any disclaimer, the term of this patent is extended or adjusted under 35 U.S.C. 154(b) by 269 days.

(21) Appl. No.: 16/956,794

(22) PCT Filed: Dec. 21, 2018

(86) PCT No.: PCT/JP2018/047357
§ 371 (c)(1),
(2) Date: Jun. 22, 2020

(87) PCT Pub. No.: WO2019/131549
PCT Pub. Date: Jul. 4, 2019

(65) Prior Publication Data
US 2020/0318676 A1 Oct. 8, 2020

(30) Foreign Application Priority Data

Dec. 27, 2017 (JP) ................................ 2017-251141

(51) Int. Cl.
*F16C 3/02* (2006.01)
*F16D 1/02* (2006.01)
(Continued)

(52) U.S. Cl.
CPC ................ *F16C 3/026* (2013.01); *F16D 1/02* (2013.01); *F16C 3/023* (2013.01);
(Continued)

(58) Field of Classification Search
CPC ...... F16C 3/023; F16C 3/026; F16C 2226/12; F16C 2226/80; F16C 2326/06;
(Continued)

(56) References Cited

U.S. PATENT DOCUMENTS 5,421,781 A * 6/1995 Mackellar ............... F16D 1/068
464/181
5,665,187 A * 9/1997 Mackellar ........... B29C 66/1222
156/305

(Continued)

FOREIGN PATENT DOCUMENTS

JP 5-139170 6/1993
JP 2000-120649 4/2000
(Continued)

OTHER PUBLICATIONS

English translation of JP 2004293714 A, Toshihiro, Oct. 21, 2004 (Year: 2004).*

(Continued)

*Primary Examiner* — Greg Binda
(74) *Attorney, Agent, or Firm* — Wenderoth, Lind & Ponack, L.L.P.

(57) ABSTRACT

A power transmission shaft includes a metal shaft member, and a resin shaft member connected to the metal shaft member in an axial direction of the power transmission shaft. The resin shaft member is made of fiber reinforced plastic. The metal shaft member and the resin shaft member are joined to each other through a close-contact fitting portion between a male spline, which is formed in an outer surface of the metal shaft member, and a female spline formed by press-fitting the male spline into the resin shaft member. An edge is formed at a radially outer edge portion of a press-fitting-start end surface of the male spline of the metal shaft member.

1 Claim, 8 Drawing Sheets (51) Int. Cl.
*F16D 1/10* (2006.01)
*F16D 1/072* (2006.01)

(52) U.S. Cl.
CPC .......... *F16C 2326/06* (2013.01); *F16D 1/072* (2013.01); *F16D 2001/103* (2013.01); *Y10T 403/7035* (2015.01)

(58) Field of Classification Search
CPC .... F16D 1/027; F16D 1/072; F16D 2001/103; Y10T 403/7035
USPC .................................................. 464/181, 183
See application file for complete search history.

(56) References Cited

U.S. PATENT DOCUMENTS

| | | | | |
|---|---|---|---|---|
| 7,192,213 | B2* | 3/2007 | Mermoz | F16C 3/023 403/1 |
| 7,485,044 | B2* | 2/2009 | Briggs | B21K 1/12 464/183 |
| 8,920,064 | B2* | 12/2014 | Reinhart | F16D 1/10 403/359.1 |
| 2002/0032065 | A1 | 3/2002 | Suzuki et al. | |
| 2002/0041790 | A1 | 4/2002 | Suzuki et al. | |
| 2003/0192880 | A1* | 10/2003 | Yablochnikov | B23K 20/06 219/617 |
| 2003/0207715 | A1 | 11/2003 | Sugiyama et al. | |
| 2006/0268081 | A1* | 11/2006 | Sugata | F16D 11/14 192/66.1 |
| 2008/0069636 | A1* | 3/2008 | Saito | F16D 1/0858 403/359.1 |
| 2012/0071250 | A1* | 3/2012 | O'Neil | F16C 3/023 464/182 |
| 2012/0157217 | A1 | 6/2012 | Nakamura et al. | |
| 2015/0147504 | A1* | 5/2015 | Kunishima | B32B 37/142 156/92 |
| 2017/0227059 | A1 | 8/2017 | Kamikawa | |
| 2019/0047607 | A1* | 2/2019 | Szostak | F16D 3/06 |

FOREIGN PATENT DOCUMENTS

| | | |
|---|---|---|
| JP | 2000-337344 | 12/2000 |
| JP | 2001-263329 | 9/2001 |
| JP | 2003-211985 | 7/2003 |
| JP | 2004-293714 | 10/2004 |
| JP | 2004-308700 | 11/2004 |
| JP | 2009-264464 | 11/2009 |
| JP | 2010-083253 | 4/2010 |
| JP | 2010-163051 | 7/2010 |
| JP | 5683798 | 3/2015 |
| JP | 2017-141865 | 8/2017 |

OTHER PUBLICATIONS

Notice of Reasons for Refusal dated Jan. 6, 2022 in corresponding Japanese Patent Application No. 2017-251141, with English Machine Translation.
International Search Report dated Feb. 19, 2019 in International (PCT) Application No. PCT/JP2018/047357.
International Preliminary Report on Patentability and Written Opinion of the International Searching Authority dated Jun. 30, 2020 in International (PCT) Application No. PCT/JP2018/047357.
Extended European Search Report dated Sep. 14, 2021 in corresponding European Patent Application No. 18895178.4.

* cited by examiner

POWER TRANSMISSION SHAFT

TECHNICAL FIELD

The present invention relates to a power transmission shaft, and more particularly, to a power transmission shaft used in automobiles and various industrial machines.

BACKGROUND ART

A power transmission shaft used in automobiles and various industrial machines is generally made of steel. However, the power transmission shaft made of steel is heavy. Therefore, in recent years, in order to reduce the weight, fiber reinforced plastic, such as carbon fiber reinforced plastic (CFRP), is used in some cases.

When the fiber reinforced plastic is used as described above, a steel member is used together. Therefore, it is necessary to join the fiber reinforced plastic and the steel member to each other. In some related arts, the fiber reinforced plastic and the steel member are joined to each other by serration coupling (spline coupling) (Patent Literature 1 to Patent Literature 3).

Figure 9:
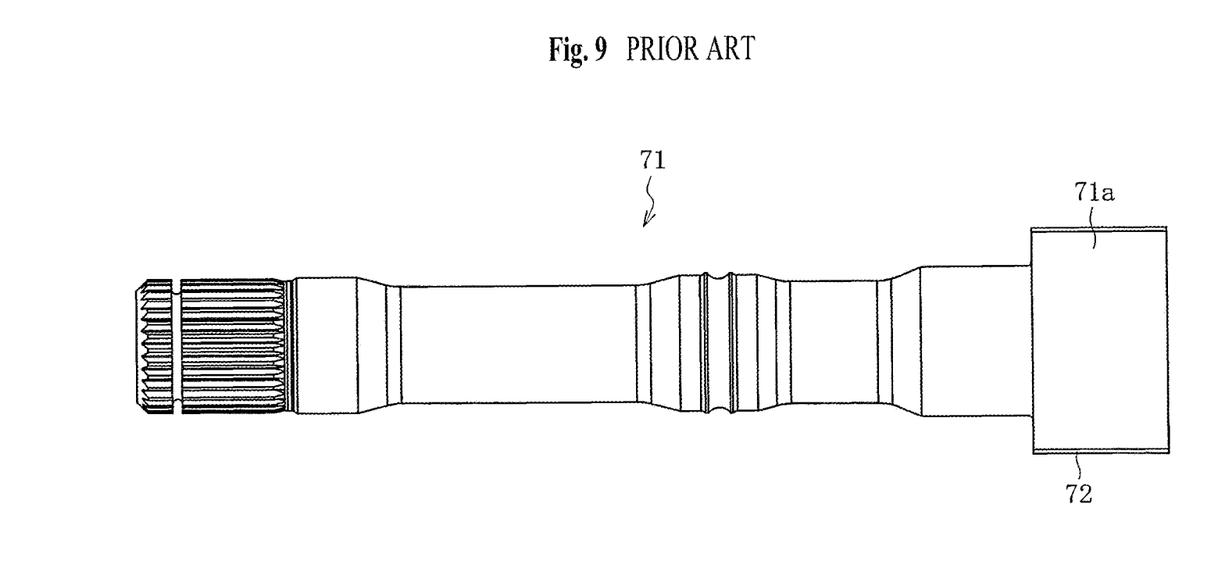
FIG. 9 is a side view for illustrating a metal shaft member of a related-art power transmission shaft.

In a configuration described in each of Patent Literatures 1 to 3, a male serration (including a male spline, and hereinafter referred to as "male spline") 72 is formed at a shaft end portion 71a of a metal shaft 71 as illustrated in FIG. 9, and the shaft end portion 71a of the metal shaft 71 is press-fitted into a tubular body (not shown) made of fiber reinforced plastic (made of FRP).

That is, the male spline 72 is press-fitted into the tubular body made of FRP, and thus is cut into a radially inner surface of the tubular body made of FRP. In this manner, the tubular body made of FRP and the metal shaft 71 are integrally joined to each other.

In some related arts, a female spline is formed in advance also in a radially inner surface of a tubular body (pipe), and the female spline and the male spline of the shaft end portion 71a of the metal shaft 71 are fitted to each other (Patent Literature 4). Moreover, in some related arts, an outer diameter of a serration portion is set slightly larger than an inner diameter of the radially inner surface of the tubular body made of FRP, and the tubular body and the metal shaft are joined to each other by compressive stress and tensile stress generated after press-fitting (Patent Literature 5). Further, in some related arts, an exterior sleeve is externally fitted to the tubular body made of FRP into which the male spline of the shaft end portion 71a of the metal shaft 71 is press-fitted, and, for example, an adhesive is interposed between an outer peripheral surface of the tubular body made of FRP and an inner peripheral surface of the exterior sleeve. (Patent Literature 6)

CITATION LIST

Patent Literature 1: JP 2000-337344 A
Patent Literature 2: JP 2004-308700 A
Patent Literature 3: JP 5683798 B
Patent Literature 4: JP 2001-263329 A
Patent Literature 5: JP 2010-83253 A
Patent Literature 6: JP 2017-141865 A

SUMMARY OF INVENTION

Technical Problem

Figure 10:
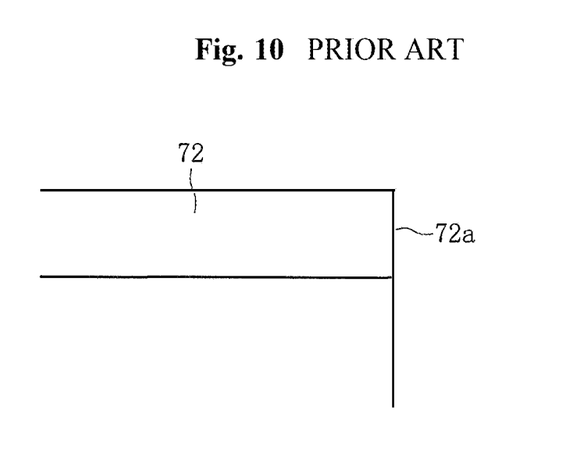
FIG. 10 is an enlarged schematic view for illustrating a main part of a male spline of the metal shaft member of the related-art power transmission shaft.

In the configuration described in Patent Literature 1 to Patent Literature 3, the male spline 72 is formed in advance in the shaft end portion 71a of the metal shaft portion (shaft) 71, and the male spline 72 is press-fitted into the tubular body (pipe) made of FRP. In this case, a shape of the male spline 72 is carved (cut) in the radially inner surface of the tubular body (pipe), thereby forming the female spline, to which the male spline 72 is fitted, in the radially inner surface. However, when the male spline 72 of the metal shaft portion 71 is press-fitted into the radially inner surface (inner peripheral surface) of the tubular body made of FRP, as illustrated in FIG. 10, a press-fitting-start end surface 72a that is orthogonal to a press-fitting direction serves as a cutting-start edge, which involves poor ease of cutting. Therefore, there is a fear in that the tubular body buckles depending on a press-fitting load and a length of the tubular body.

Further, when ease of carving, namely, ease of cutting of the spline cannot be satisfactorily kept, the tubular body is radially expanded due to the press-fitting of the metal shaft portion. When the tubular body is thus radially expanded, a close-contact area between a tooth surface of the female spline formed (carved) in the radially inner surface of the tubular body and a tooth surface of the spline of the metal shaft portion is reduced. Therefore, there is a fear in that allowable transmission torque is reduced.

In Patent Literature 4, it is necessary to form in advance the female spline fitted to the male spline, and also necessary to perform phase matching between the male spline and the female spline. Therefore, productivity is poor. Further, in Patent Literature 5, the tubular body and the metal shaft are joined to each other by compressive stress and tensile stress generated after press-fitting, and there is a problem in a joining force. Therefore, there is a fear in that allowable transmission torque is reduced. Further, in Patent Literature 6, the number of components is increased. Therefore, there are disadvantages in terms of productivity and cost.

Therefore, in view of the above-mentioned problems, the present invention has been made to provide a power transmission shaft, which is capable of improving ease of cutting given when a metal shaft member is press-fitted into a resin shaft member, satisfactorily securing a close-contact area between tooth surfaces in a close-contact fitting region, and effectively preventing reduction in allowable transmission torque, and is also excellent in productivity.

Solution to Problem

According to the present invention, there is provided a power transmission shaft, comprising: a metal shaft member; and a resin shaft member connected to the metal shaft member in an axial direction of the power transmission shaft, wherein the resin shaft member is made of fiber reinforced plastic, wherein the metal shaft member and the resin shaft member are joined to each other through a close-contact fitting region between a male spline, which is formed in an outer surface of the metal shaft member, and a female spline formed by press-fitting the male spline into the resin shaft member, and wherein an edge is formed at a radially outer edge portion of a press-fitting-start end surface of the male spline of the metal shaft member so as to protrude forward in a press-fitting direction.

The edge is formed at the radially outer edge portion of the press-fitting-start end surface of the male spline of the metal shaft member so as to protrude forward in the press-fitting direction. With this configuration, at the time of press-fitting, the edge serves as the cutting-start edge, thereby being capable of improving ease of cutting.

The press-fitting-start end surface of the male spline can be formed into an end-surface-side tapered surface inclining backward in the press-fitting direction from an outer edge toward a radially inner side of the press-fitting-start end surface. When the end-surface-side tapered surface is formed, the edge can be stably formed. Further, an outer surface of each of projecting teeth of the male spline may be formed into a radially-outer-side tapered surface inclining backward in the press-fitting direction from a press-fitting-start edge toward a radially inner side of each of the projecting teeth. Also when the radially-outer-side tapered surface described above is formed, the edge can be stably formed.

Advantageous Effects of Invention

According to the present invention, ease of cutting can be improved, and hence the press-fitting load can be suppressed. Thus, the resin shaft member does not buckle at the time of press-fitting. In addition, ease of cutting of the male spline can be satisfactorily kept, and increase in diameter of the resin shaft member due to press-fitting of the metal shaft member can be effectively prevented. Thus, a contact area between tooth surfaces in a close-contact fitting region (meshing region) can be satisfactorily secured, and reduction in allowable transmission torque can be effectively prevented. Further, the metal shaft member and the resin shaft member can be stably joined to each other by simply press-fitting the metal shaft member into the resin shaft member, and hence productivity is excellent.

DESCRIPTION OF EMBODIMENTS

Figure 7:
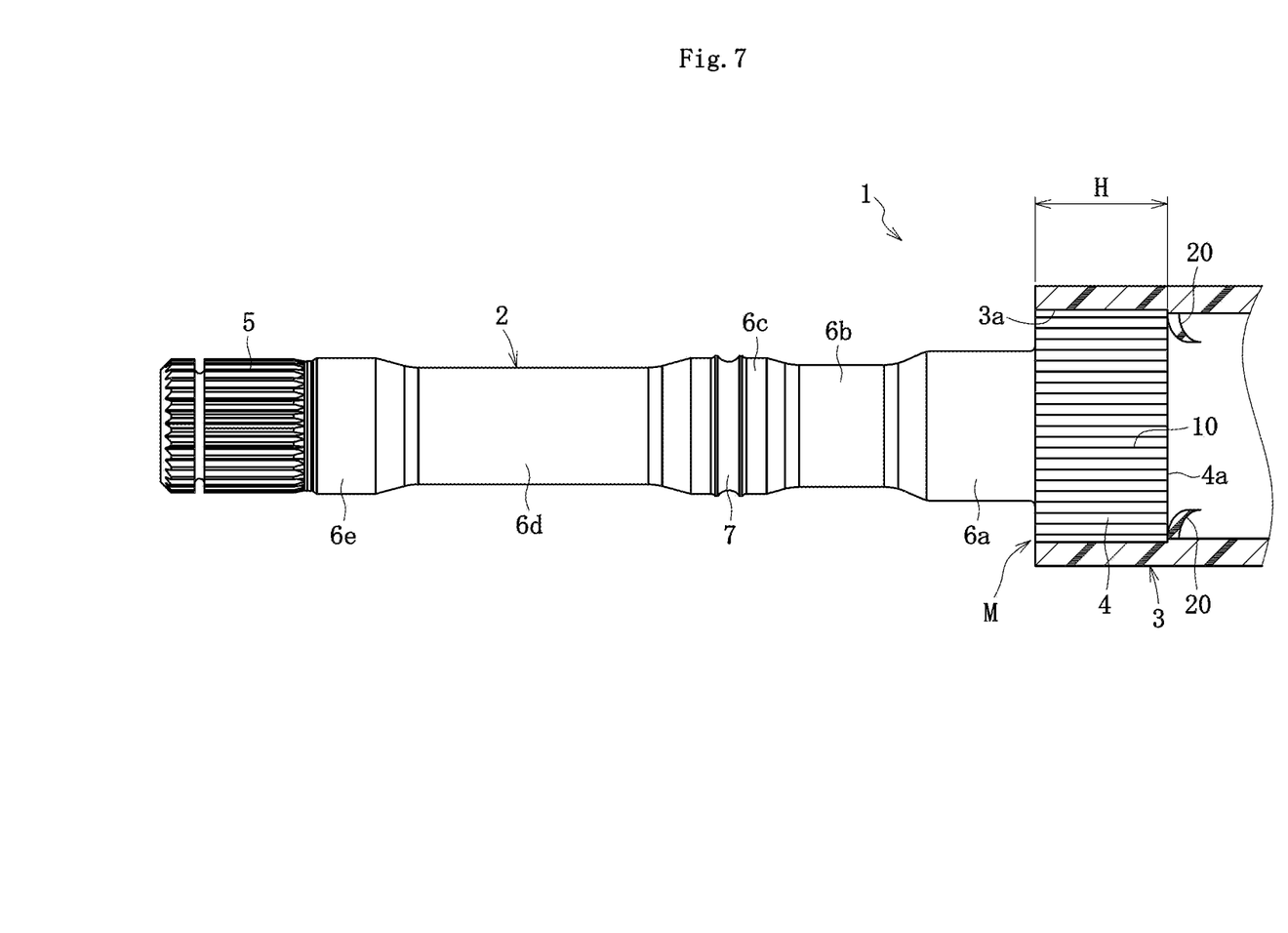
FIG. 7 is a sectional view for illustrating the main part of the power transmission shaft under a state in which press-fitting of the metal shaft member into the resin shaft member is completed.
Figure 8:
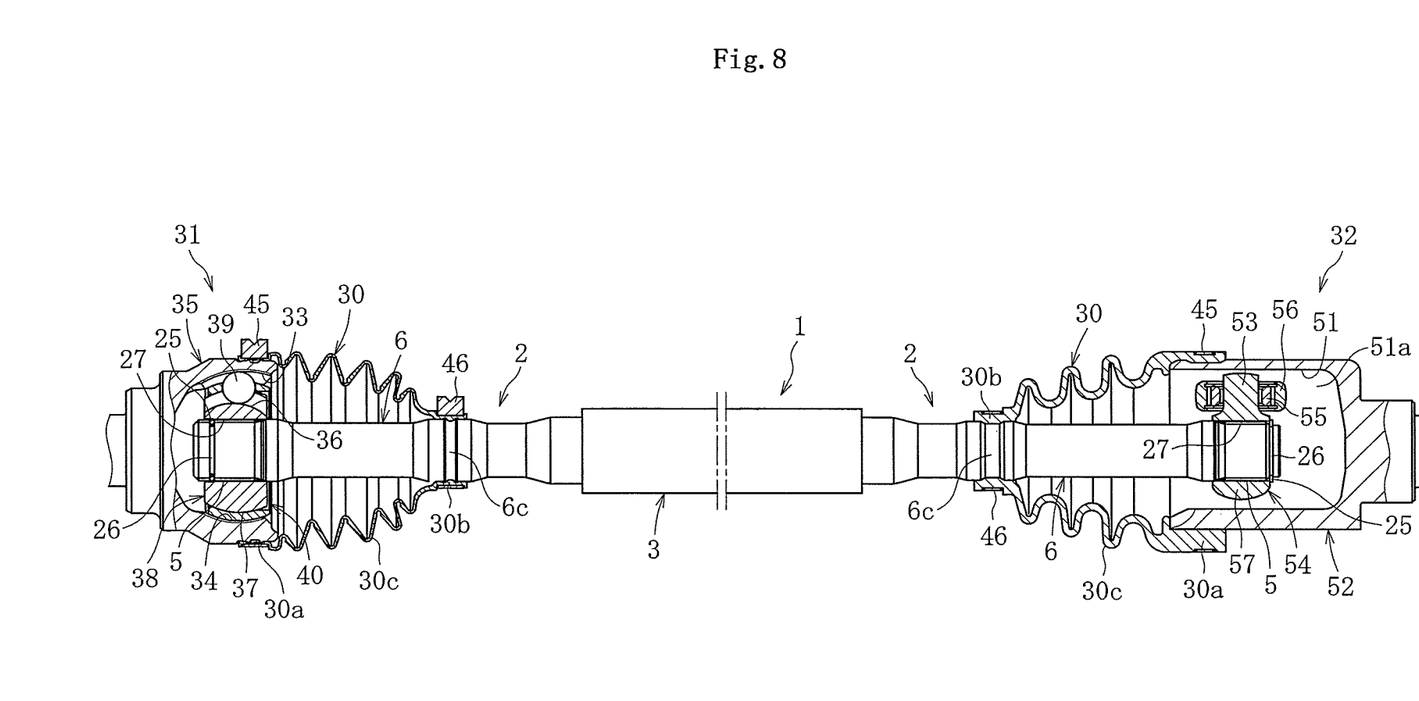
FIG. 8 is a sectional view for illustrating a drive shaft using the power transmission shaft according to the present invention.

Now, an embodiment of the present invention is described with reference to FIG. 1 to FIG. 8. FIG. 8 is a view for illustrating a drive shaft using a power transmission shaft 1 according to the present invention. The power transmission shaft 1 comprises a pair of metal shaft members 2 and 2, and a resin shaft member 3 connected to the metal shaft members 2 and 2 in an axial direction of the power transmission shaft 1. That is, the resin shaft member 3 forms an intermediate shaft arranged between the pair of metal shaft members 2 and 2 and configured to connect the pair of metal shaft members 2 and 2 to each other.

The drive shaft is obtained by connecting a fixed type constant velocity universal joint 31 and a plunging type constant velocity universal joint 32 with the power transmission shaft 1 according to the present invention. In the illustrated example, a Barfield-type constant velocity universal joint is used as the fixed type constant velocity universal joint 31, and a tripod type constant velocity universal joint is used as the plunging type constant velocity universal joint 32.

The fixed type constant velocity universal joint 31 comprises an outer joint member 35 in which a plurality of track grooves 33 extending in an axial direction are formed on a radially inner surface 34, an inner joint member 38 in which a plurality of track grooves 36 extending in the axial direction are formed on a radially outer surface 37 at equal intervals in a circumferential direction, a plurality of balls 39 interposed between the track grooves 33 of the outer joint member 35 and the track grooves 36 of the inner joint member 38 and configured to transmit torque, and a cage 40 interposed between the radially inner surface 34 of the outer joint member 35 and the radially outer surface 37 of the inner joint member 38 and configured to hold the balls 39.

The plunging type constant velocity universal joint 32 comprises an outer joint member 52 in which three track grooves 51 extending in an axial direction are arranged on an inner periphery and roller guide surfaces 51a opposed to each other are arranged on inner side walls of respective track grooves 51, a tripod member 54 comprising three leg shafts 53 protruding in a radial direction, an inner side roller 55 that is externally fitted onto the leg shaft 53, and an outer side roller 56 which is inserted into the track groove 51 and is externally fitted onto the inner side roller 55. A plurality of needle rollers (not shown) are interposed between the outer side roller 56 and the inner side roller 55. That is, the plunging type constant velocity universal joint 32 is a double roller type in which the outer side roller 56 can freely rotate with respect to the leg shaft 53 and move along the roller guide surface 51a. Further, the tripod member 54 comprises a boss 57 and the leg shafts 53. The leg shafts 53 protrude in the radial direction from trisected positions in the circumferential direction of the boss 57.

An axial end fitting portion of the power transmission shaft 1 is fitted into a shaft hole of the inner joint member 38 in the fixed type constant velocity universal joint 31 so as to transmit torque, and an axial end fitting portion of the power transmission shaft 1 is fitted into a shaft hole of the tripod member 54 in the plunging type constant velocity universal joint 32 so as to transmit torque. End portions of both the axial end fitting portions of the power transmission shaft 1 are retainedwith retaining rings 25 and 25, such as snap rings, respectively. That is, circumferential grooves 26 and 26 are formed in the end portions of the axial end fitting portions, and the retaining rings 25 and 25 are fitted into the circumferential grooves 26 and 26.

Male splines 5 and 5 are formed on radially outer parts of axial end fitting portions located at both ends of the power transmission shaft 1, and female splines 27 and 27 are formed in the shaft holes of the inner joint member 38 and the tripod member 54 of both the constant velocity universal joints. The axial end fitting portions located at the both ends of the power transmission shaft 1 are fitted into the shaft holes of the inner joint member 38 and the tripod member 54 of the constant velocity universal joints 31 and 32, to thereby mesh and couple the male splines 5 and 5 and the female splines 27 and 27 with each other, with the result that a torque can be transmitted between the shaft 1 and the inner joint member 38 and between the power transmission shaft 1 and the tripod member 54.

Boots 30, which are configured to prevent penetration of foreign matters from outside and leakage of grease from inside, are mounted between the power transmission shaft 1 and the outer joint members 35 and 52, respectively. The boot 30 comprises a large-diameter end portion 30a, a small-diameter end portion 30b, and a bellows portion 30c configured to connect the large-diameter end portion 30a and the small-diameter end portion 30b to each other. The large-diameter end portion 30a of the boot 30 is fastened to be fixed at an opening end of the outer joint member 35 or an opening end of the outer joint member 52 with a boot band 45, and the small-diameter end portion 30b of the boot 30 is fastened to be fixed at a boot mounting portion 6c of the power transmission shaft 1, which is described later, with a boot band 46.

Figure 1:
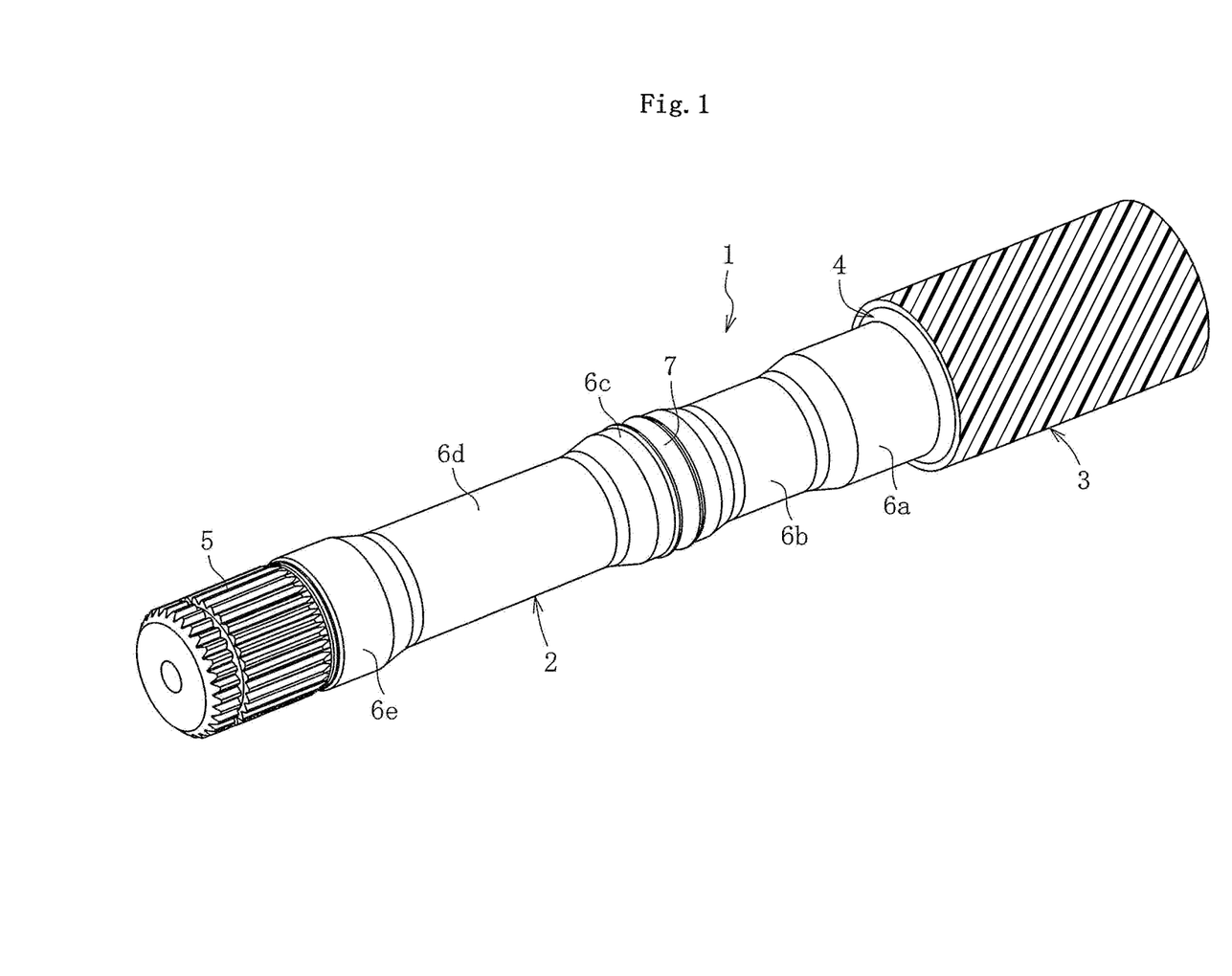
FIG. 1 is a perspective view for illustrating a main part of a power transmission shaft according to the present invention.
Figure 2:
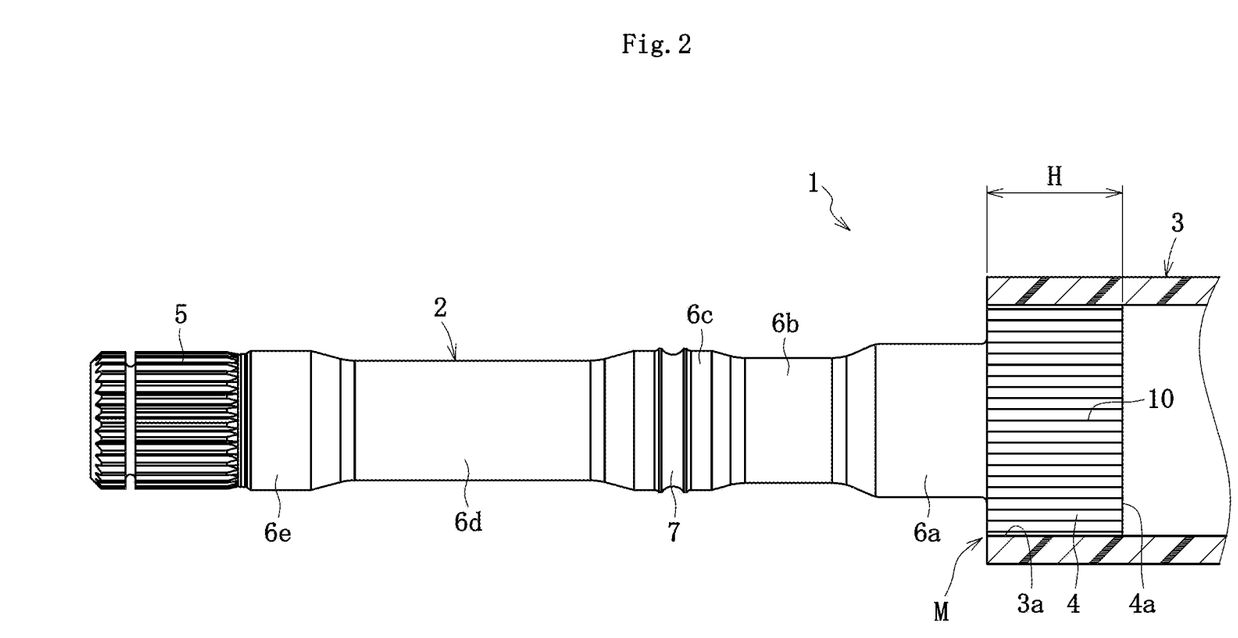
FIG. 2 is a sectional view for illustrating the main part of the power transmission shaft illustrated in FIG. 1.

As illustrated in FIG. 1 and FIG. 2, the metal shaft member 2 comprises a large-diameter boss portion 4 formed at one end portion thereof, and a male spline 5 formed at another end portion thereof. That is, a medium-diameter portion 6a, a small-diameter portion 6b, the boot mounting portion 6c, a small-diameter portion 6d, and a medium-diameter portion 6e are formed in the stated order from the large-diameter boss portion 4 toward the male spline 5. A circumferential recessed groove 7 is formed in the boot mounting portion 6c. When the small-diameter end portion 30b of the boot 30 (see FIG. 8) is mounted to the boot mounting portion 6c, a part of a radially inner surface of the small-diameter end portion 30b is fitted into the circumferential recessed groove 7.

The resin shaft member 3 is formed of a tubular body made of fiber reinforced plastic (FRP). The tubular body made of FRP is formed by a filament winding method or a sheet winding method. The filament winding method is a method of winding carbon fibers (fiber bundle) impregnated with a resin around a spindle to form a tubular body, and removing the spindle after the tubular body is heated and hardened. A method of winding a sheet of fibers in place of the bundle of fibers is referred to as "sheet winding".

Figure 3:
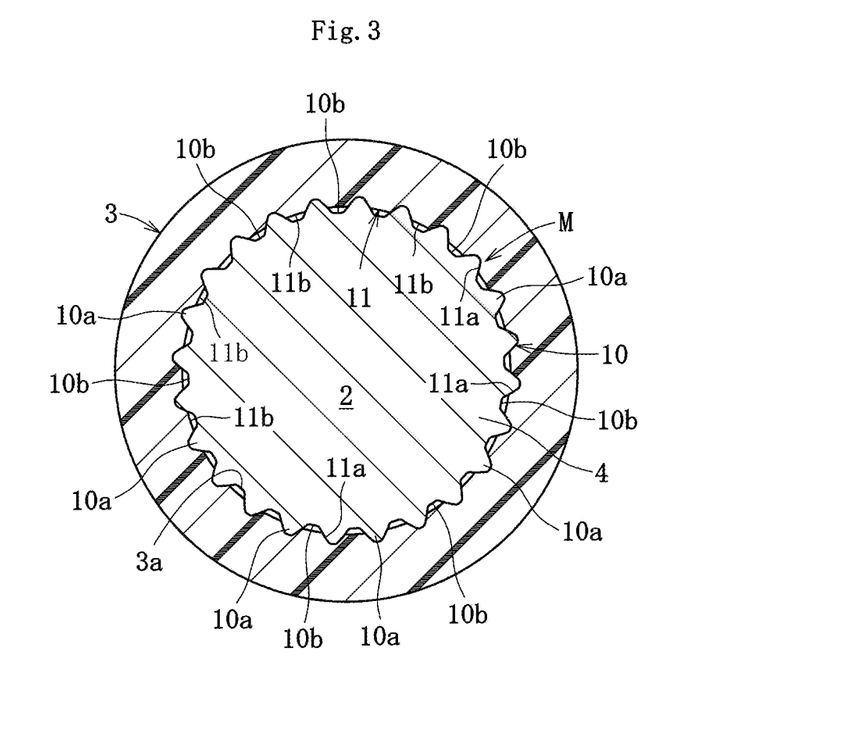
FIG. 3 is an enlarged sectional view for illustrating a joining region between a metal shaft member and a resin shaft member of the power transmission shaft illustrated in FIG. 1.

In this case, as illustrated in FIG. 3, an opening end portion 3a of the resin shaft member 3 is externally fitted and joined to the large-diameter boss portion 4 of the metal shaft member 2. In this case, the large-diameter boss portion 4 of the metal shaft member 2 and the opening end portion 3a of the resin shaft member 3 are coupled to each other through a close-contact fitting portion M.

That is, a male spline (including a male serration) 10 is formed in a radially outer surface (outer surface) of the large-diameter boss portion 4 of the metal shaft member 2, and a female spline (including a female serration) 11 is formed in a radially inner surface of the opening end portion 3a of the resin shaft member 3. The male spline 10 and the female spline 11 are fitted to each other. The male spline 10 comprises a plurality of projecting teeth 10a and a plurality of recessed roots 10b arranged alternately in a circumferential direction. The female spline 11 comprises a plurality of recessed roots 11a and a plurality of projecting teeth 11b arranged alternately in the circumferential direction. The projecting teeth 10a of the male spline 10 are fitted to the recessed roots 11a of the female spline 11, and the projecting teeth 11b of the female spline 11 are fitted to the recessed roots 10b of the male spline 10. In this case, the recessed root 11a and the projecting tooth 10a are held in close contact with each other over an entire fitting contact portion 12 (see FIG. 4).

Next, a method of forming the close-contact fitting portion M is described. In this case, the male spline 10 is formed in the radially outer surface of the large-diameter boss portion 4 of the metal shaft member 2. The male spline 10 can be formed by various working methods such as broaching, cutting, pressing, and drawing, which are well-known and well-used methods. Further, a thermal hardening treatment may be applied to the male spline 10. As the thermal hardening treatment, various kinds of heat treatment such as induction hardening and carburizing and quenching can be adopted.

Figure 5A:
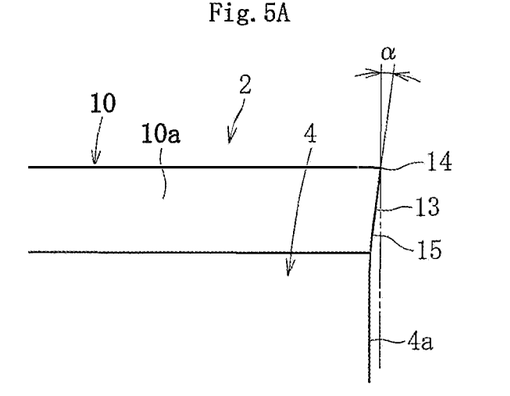
FIG. 5A is an illustration of a press-fitting-start end portion of the metal shaft member, and is a schematic view for illustrating the press-fitting-start end portion comprising an edge.
Figure 6:
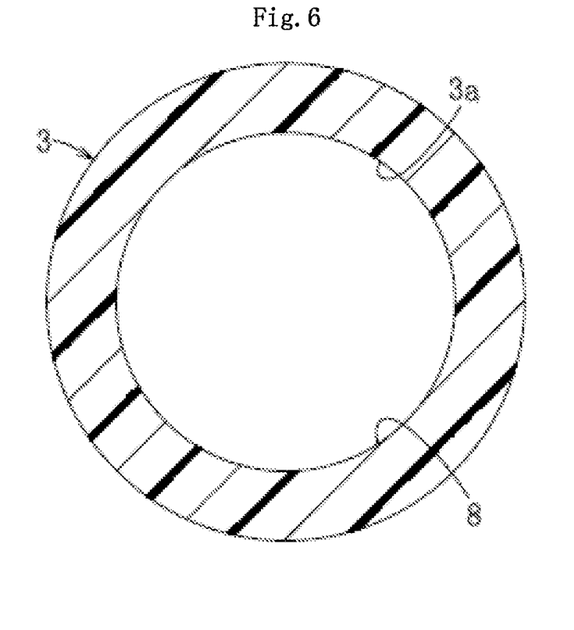
FIG. 6 is an enlarged sectional view for illustrating the resin shaft member before the metal shaft member is press-fitted into the resin shaft member.

In contrast, as illustrated in FIG. 6, the radially inner surface of the opening end portion 3a of the resin shaft member 3 is left as a cylindrical surface 8 having no female spline 11. Further, as illustrated in FIG. 5A, at an end surface of the male spline 10 of the metal shaft member 2, namely, a radially outer edge portion of a press-fitting-start end surface 13, an edge 14 is formed so as to protrude forward in a press-fitting direction. In this case, the press-fitting-start end surface 13 of the male spline 10 is formed into an end-surface-side tapered surface 15 inclining to an upstream side in the press-fitting direction (backward in the press-fitting direction) from an outer edge toward a radially inner side of the press-fitting-start end surface 13. With this configuration, the edge 14 is formed. In this case, an end surface (end surface excluding the end surface of the male spline 10) 4a of the large-diameter boss portion 4 of the metal shaft member 2 is recessed from the edge 14. An inclination angle $\alpha$ of the end-surface-side tapered surface 15 is set to, for example, from about 5° to about 30°. It is preferred that the inclination angle $\alpha$ be set to about 15°, which is approximately a median angle.

Figure 5B:
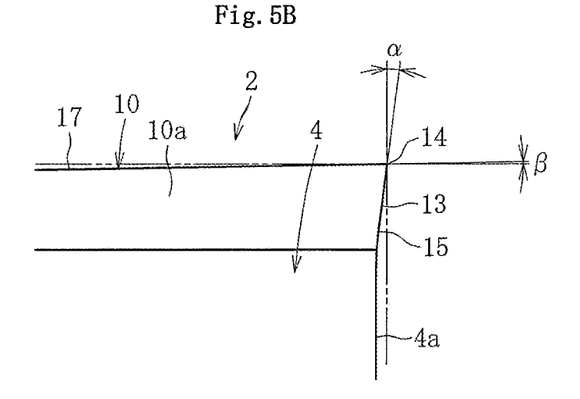
FIG. 5B is an illustration of the press-fitting-start end portion of the metal shaft member, and is a schematic view for illustrating the press-fitting-start end portion comprising an edge having another shape.

As illustrated in FIG. 5B, an outer surface of each of the projecting teeth 10a of the male spline 10 may be formed into a radially-outer-side tapered surface 17 inclining backward in the press-fitting direction from a press-fitting-start edge toward a radially inner side of each of the projecting teeth 10a. In this case, even when only the radially-outer-side tapered surface 17 is formed without forming the end-surface-side tapered surface 15, the edge 14 can be formed at the radially outer edge portion of the press-fitting-start end surface 13. However, as illustrated in FIG. 5B, the edge 14 is formed by forming the end-surface-side tapered surface 15 and the radially-outer-side tapered surface 17. An inclination angle $\beta$ of the radially-outer-side tapered surface 17 is set to, for example, from about 5° to about 30°. It is preferred that the inclination angle $\beta$ be set to about 15°, which is approximately a median angle.

Figure 4:
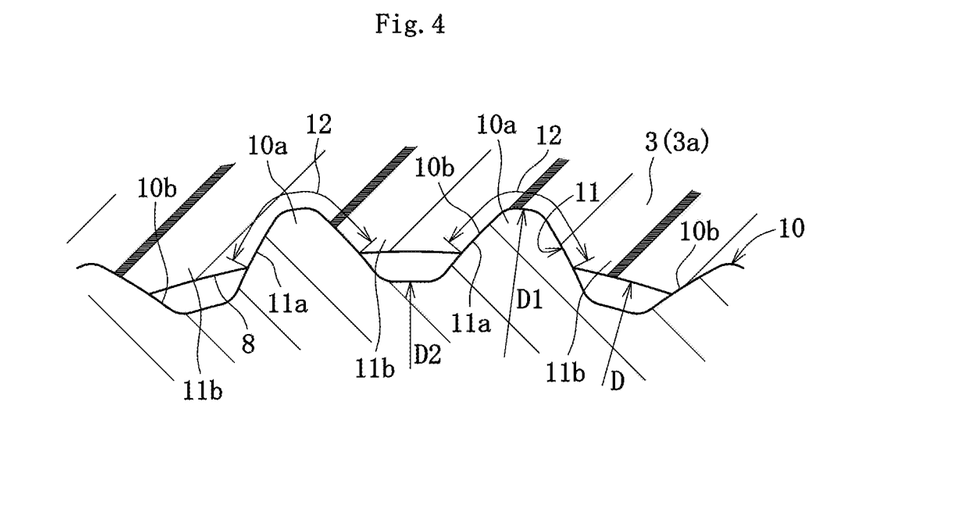
FIG. 4 is an enlarged sectional view for illustrating a main part of FIG. 3.

Next, after the male spline 10 is formed as illustrated in FIG. 5A and FIG. 5B, the male spline 10 is press-fitted into the opening end portion 3a of the resin shaft member 3. In this case, as illustrated in FIG. 4, when D represents an inner diameter dimension of the radially inner surface of the opening end portion 3a of the resin shaft member 3, D1 represents a spline large diameter of the male spline 10, and D2 represents a spline small diameter of the male spline 10, a relation of D2<D<D1 is satisfied. When the radially-outer-side tapered surface 17 is formed as illustrated in FIG. 5B, the spline large diameter refers to an outer diameter dimension of the edge 14 of the radially outer edge portion of the press-fitting-start end surface 13.

When the male spline 10 configured as described above is press-fitted into the opening end portion 3a of the resin shaft member 3, the projecting teeth 10a of the male spline 10 bite into the radially inner surface of the opening end portion 3a of the resin shaft member 3 so that the female spline 11 fitted to the male spline 10 can be carved in the radially inner surface of the opening end portion 3a of the resin shaft member 3. In addition, the edge 14 is formed at the radially outer edge portion of the press-fitting-start end surface 13, and hence the edge serves as a cutting-start edge at the time of press-fitting, thereby being capable of improving ease of cutting.

Incidentally, a range H illustrated in FIG. 2 indicates a range of the close-contact fitting portion M. The range H can be set suitably, and can be set in consideration of, for example, a joining force between the metal shaft member 2 and the resin shaft member 3, the outer diameter dimension of the large-diameter boss portion 4 of the metal shaft member 2, and the fiber reinforced plastic to be used. When the male spline 10 is press-fitted into the opening end portion 3a of the resin shaft member 3 and the female spline 11 fitted to the male spline 10 is thus carved in the radially inner surface of the opening end portion 3a of the resin shaft member 3, chips 20 as illustrated in FIG. 7 are formed. However, FIG. 2 is an illustration of a case in which the chips 20 are removed. When the power transmission shaft is used, the chips 20 may remain as they are as illustrated in FIG. 7, or the chips 20 may be removed as illustrated in FIG. 2.

As described above, according to the power transmission shaft of the present invention, the edge 14 serves as the cutting-start edge. Thus, ease of cutting can be improved, and a press-fitting load can be suppressed. Therefore, the resin shaft member 3 does not buckle at the time of press-fitting. In addition, ease of cutting of the male spline 10 can be satisfactorily kept, and increase in diameter of the resin shaft 3 member due to press-fitting of the metal shaft member 2 can be effectively prevented. Thus, a contact area between tooth surfaces in the close-contact fitting portion (meshing portion) M can be satisfactorily secured, and reduction in allowable transmission torque can be effectively prevented. Further, the metal shaft member 2 and the resin shaft member 3 can be stably joined to each other by simply press-fitting the metal shaft member 2 into the resin shaft member 3, and hence productivity is excellent.

The edge 14 can be stably formed by forming the press-fitting-start end surface 13 of the male spline 10 into the end-surface-side tapered surface 15 inclining backward in the press-fitting direction from the outer edge toward the radially inner side of the press-fitting-start end surface 13. Further, the edge 14 can be stably formed also by forming the outer surface of each of the projecting teeth 10a of the male spline 10 into the radially-outer-side tapered surface 17 inclining backward in the press-fitting direction from the press-fitting-start edge toward the radially inner side of each of the projecting teeth 10a.

The embodiment of the present invention is described above. However, the present invention is not limited to the above-mentioned embodiment and may be variously modified. As the fiber reinforced plastic, for example, glass fiber reinforced plastic (GFRP) or carbon fiber reinforced plastic (CFRP) may be used, and boron fiber reinforced plastic (BFRP), aramid fiber reinforced plastic (AFRP or KFRP), or polyethylene fiber reinforced plastic (DFRP) may also be used. In addition, as the short fiber to be impregnated, for example, a glass fiber or a carbon fiber may be used, and a carbon nanotube (CNT) or a cellulose nanofiber (CNF) may also be used.

The fiber reinforced plastic may be wound by hoop winding or helical winding. The hoop winding is a method of winding fibers so that an angle formed between a center axis and a direction of winding the fibers is substantially a right angle. Here, "substantially a right angle" encompasses both an angle of 90° and an angle of around 90° formed when winding positions of fibers are shifted so as to prevent overlapping of the fibers. Further, the helical winding is a method of winding fibers so that an angle formed between a center axis and a direction of winding the fibers is a predetermined angle.

A thickness dimension and the outer diameter dimension of the resin shaft member 3 can be set suitably in accordance with, for example, a portion to which the resin shaft member 3 is applied, and an entire length of the power transmission shaft. The thickness dimension and the outer diameter dimension of the resin shaft member 3 can be set variously within a range capable of dealing with torque transmission and preventing increase in diameter and weight.

The inclination angles $\alpha$ and $\beta$ of the end-surface-side tapered surface 15 and the radially-outer-side tapered surface 17, which are configured to form the edge 14, are not limited to the above-mentioned angles. The inclination angles $\alpha$ and $\beta$ can be variously changed within a range capable of improving ease of cutting and suppressing the press-fitting load.

As a shape of each of the projecting teeth 10a of the male spline 10, there can be adopted various shapes such as a triangular sectional shape, a trapezoidal sectional shape, a semicircular shape, a semi-elliptic shape, and a rectangular shape. For example, an area of each of the projecting teeth 10a, the number of the projecting teeth 10a, and an arrangement pitch of the projecting teeth 10a in the circumferential direction can be changed suitably.

INDUSTRIAL APPLICABILITY

The present invention is usable for a shaft configured to couple a fixed type constant velocity universal joint and a plunging type constant velocity universal joint to each other. As the fixed type constant velocity universal joint, a Bar-field-type constant velocity universal joint or an undercut-free constant velocity universal joint may be used. As the plunging type constant velocity universal joint, a tripod type constant velocity universal joint, a double-offset constant velocity universal joint, or a cross-groove constant velocity universal joint may be used.

REFERENCE SIGNS LIST

M close-contact fitting portion
$\alpha$ inclination angle
2 metal shaft member
3 resin shaft member
10 male spline
11 female spline
13 press-fitting-start end surface
14 edge
15 end-surface-side tapered surface
17 radially-outer-side tapered surface

The invention claimed is:
1. A power transmission shaft, comprising:
a metal shaft member; and
a resin shaft member connected to the metal shaft member in an axial direction of the power transmission shaft,
wherein the resin shaft member is made of fiber reinforced plastic,
wherein the metal shaft member and the resin shaft member are joined to each other through a close-contact fitting portion between a male spline, which is formed in an outer surface of the metal shaft member, and a female spline formed by press-fitting the male spline into the resin shaft member,
wherein a press-fitting-start end surface of the male spline has an end-surface-side tapered surface inclining away from a press-fitting direction from an outer edge toward a radially inner side of the press-fitting-start end surface,
wherein an outer surface of each of a plurality of projecting teeth of the male spline has a radially-outer-side tapered surface inclining away from the press-fitting direction from a press-fitting-start edge toward a radially inner side of a corresponding one the projecting teeth,
wherein the press-fitting-start edges, which are cutting start edges, are formed at intersections of the end-surface-side tapered surface and the radially-outer-side tapered surfaces at radially outer edge portions of the press-fitting-start end surface of the male spline of the metal shaft member so as to protrude forward in the press-fitting direction,
wherein a taper angle of the end-surface-side tapered surface is set to from 5° to 30° and a taper angle of the radially-outer-side tapered surface is set to from 5° to 30°, and
wherein the cutting start edges are arranged at a radially outermost position and at a farthest distal end position in the press-fitting direction.

* * * * *